UNITED STATES PATENT OFFICE.

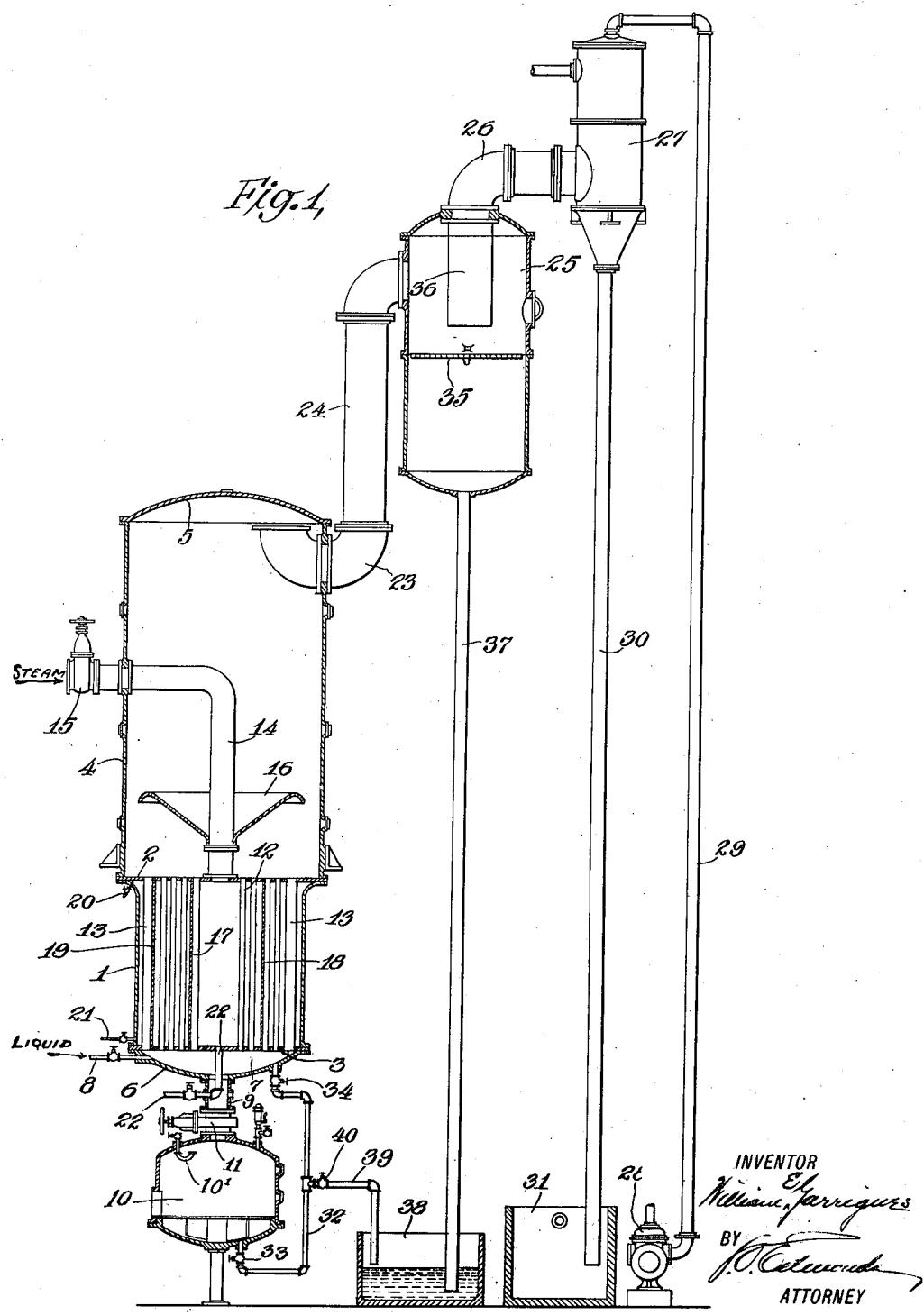

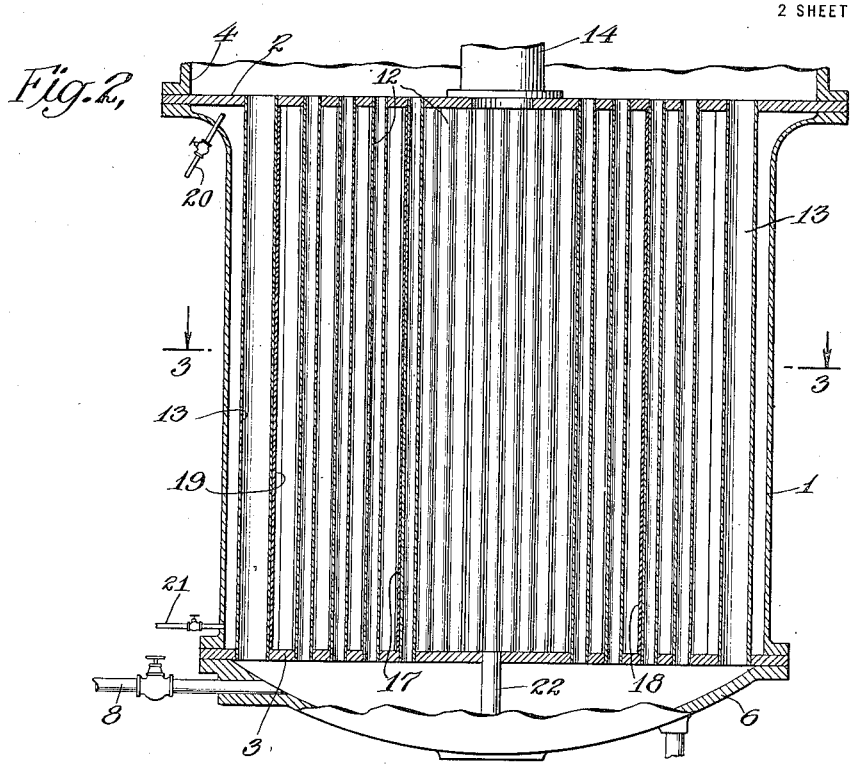
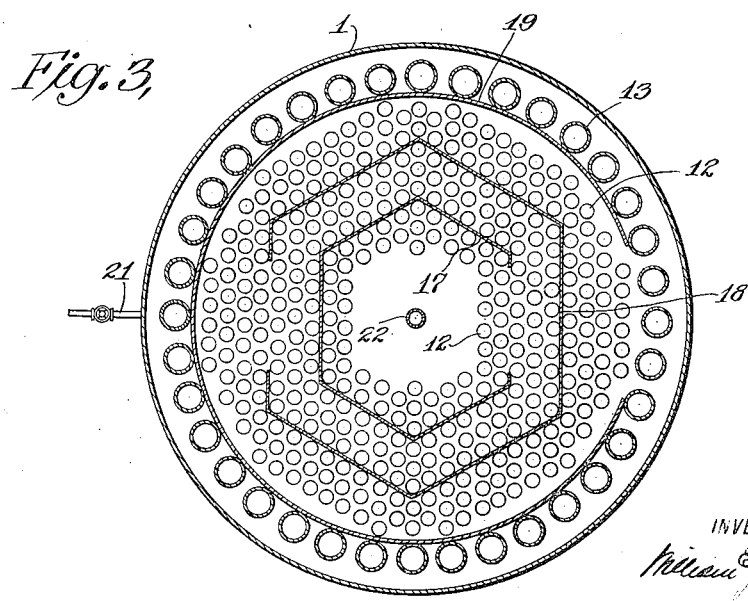

WILLIAM E. GARRIGUES, OF NEW ORLEANS, LOUISIANA, ASSIGNOR TO WILLIAM GARRIGUE & COMPANY, INC., OF NEW YORK, N. Y., A CORPORATION OF NEW YORK.

EVAPORATOR.

1,298,925.   Specification of Letters Patent.   Patented Apr. 1, 1919.

Application filed September 28, 1917. Serial No. 193,757.

*To all whom it may concern:*

Be it known that I, WILLIAM E. GARRIGUES, a citizen of the United States, residing at New Orleans, in the parish of Orleans and State of Louisiana, have invented certain new and useful Improvements in Evaporators, of which the following is a specification.

My invention relates to apparatus for evaporating liquids in which crystalline matter precipitates during the process. It may be utilized, for example, in the evaporation of crude glycerin; many other uses, however, will be apparent. Apparatus is well-known in which liquids are evaporated by a calandria heated by steam, the vapor being drawn therefrom by a vacuum to a condenser. My improvements consist in part in so constructing the calandria that the heating of the tubes therein diminishes progressively from the center to the periphery, the outside tubes being used as the downcomers, and liquid to be evaporated being caused by a series of baffles to rise through the inner tubes and descend through the outer continually through the process. The current of liquid in the space below the tubes, being toward the center, will sweep all crystals and other solid material toward the center, from which point such material may be caused to drop into a suitable collecting vessel.

Another part of my improvement consists in causing the vapor to pass through an elevated separating vessel on the way to the condenser, the bottom of said separating vessel being connected by a barometric column of liquid with a vessel containing liquid. The construction is such that any liquid carried over with the vapor will drop through the tube to the vessel below, in which it will be readily apparent. This furnishes an indication that the heating is being conducted too rapidly, so that the heat supply may be diminished until liquid no longer appears in the vessel at the bottom of the tube referred to. This vessel may be connected with the bottom of the evaporator and the liquid collected in the vessel drawn back into the system whenever desired.

In order that a clearer understanding of my invention may be had, attention is hereby directed to the accompanying drawings forming part of this application and illustrating certain embodiments of my invention. In the drawings, Figure 1 represents a view partly in elevation and partly in section of an evaporating system comprising my invention, Fig. 2 is an enlarged vertical section through the calandria, in which the evaporating tubes are located, and Fig. 3 is a cross-section taken on line 3—3 of Fig. 2.

Referring to the drawings, the calandria comprises a casing 1, preferably cylindrical, having upper and lower heads 2 and 3 extending across the same. A casing 4 extends upwardly from casing 1 and is provided with a top plate 5. Casing 1 is closed at the bottom by a plate 6, which preferably curves or slopes downwardly from the periphery to the center thereof, providing a space 7 below the lower header into which extends a pipe connection 8 for introducing the liquid to be evaporated. The central or lower portion of the bottom plate 6 of the evaporator below the calandria is connected by a tubular member 9 with the vessel 10 in which crystals and solid matter are to be collected, the connection 9 being provided with a suitable valve 11.

The evaporating tubes, which extend between and through the heads 2 and 3, comprise a considerable number of inner tubes 12 and a series of outer tubes 13 of larger diameter than tubes 12. A heating medium, such as superheated steam, is introduced at the axis of the calandria, in a space surrounded by the inner ones of the tubes 12, by means of a pipe 14 provided with a suitable valve 15, pipe 14 preferably extending through the casing 4 and the upper header 2. Means are provided for causing liquid rising from the inner tubes to be deflected toward the outer wall of the chamber above head 2. This preferably takes the form of a conical dash plate 16 secured about the lower portion of pipe 14.

Means are provided for causing the heating medium to pass around the inner tubes 12 successively from the center toward the periphery and then around the outer tubes 13, so that the heat imparted to the various tubes will diminish progressively from the center to the periphery. This may be accomplished by a series of baffle plates, such as hexagonal plates 17 and 18, extending in parallel relation between the tubes 12, and the cylindrical baffle plate 19 extending on the inner side of the outer tubes 13. These plates extend between the upper and lower heads and have openings in staggered relation, so that the steam will first circulate around the tubes 12 on the inner side of baffle plate 17, will then heat the tubes between baffle plates 17 and 18, then the tubes between baffle plates 18 and 19 and will then heat the outer tubes 13. The outer casing 1 may be provided with a pair of vents 20 and 21 connected with the outer steam space within the calandria, through which air and other non-condensable gases may be removed. The apparatus described may, of course, be connected with similar apparatus for multiple effect operation, if desired. A drip pipe 22 is connected with the lower portion of the steam space in the calandria, to remove the condensed steam.

In operation, liquid to be evaporated is introduced through pipe connection 8 to fill the space 7 below the tubes, vessel 10 and tubes 12 and 13, valve 11 being open. Upon turning on the steam, evaporation will start at the center and more gradually from the outer ones of the tubes 12. It should be understood that as is usual in apparatus of this character, the upper portion of the evaporator is connected by means of an elbow 23, pipe 24, separator 25 and pipe connection 26 with a condenser 27, vacuum being maintained in the system, as by means of a vacuum pump 28 connected to the condenser by a pipe 29. The condenser is connected by pipe 30 to the usual hot well 31.

Liquid rising with the vapor from the inner tubes 12 is deflected by dash plate 16 toward the periphery and falls into the outer tubes 13. The liquid in these tubes, being cold relatively to the liquid in the inner tubes, will descend, move toward the center in the bottom space 7 and then rise through the inner tubes, so that there will be a continuous circulation as long as liquid remains in the apparatus. As crystals are formed in the liquid, they will be swept along the downwardly sloping bottom plate 6 of the evaporator toward the center by the current of liquid, and falling into the connection 9 will drop into the collecting vessel 10. When vessel 10 is filled with solid matter, valve 11 may be closed. A pipe connection 32, provided with valves 33 and 34, extends from the bottom of collecting vessel 10 to the space 7 at the bottom of the evaporator, so that liquid in vessel 10 may be drawn back into the system when desired upon opening valves 33 and 34, steam being blown into vessel 10 if desired through connection 10'.

The separating vessel 25 is provided with a screen 35 and has an upwardly extending pipe 36 in its upper portion leading through connection 26 to the condenser. Vapor entering the separating chamber from connection 24 passes through pipe 36, while any liquid which may be carried with the vapor will fall through screen 35 and through the tube 37 extending into a liquid seal in the open vessel 38. Pipe 37 is of sufficient length to balance the vacuum in the system, and may be filled with water. Liquid dropping through the separating chamber and pipe 37 will appear in the liquid in vessel 38 and thereby provide an indication of the manner in which the process is being carried out. Vessel 38 may be connected by pipe connection 39, provided with a valve 40, with pipe 32, so that when desired the liquid in vessel 38 may be drawn into the evaporator, valves 34 and 40 being opened and valve 33 closed.

It is not essential that the heating medium be admitted centrally of the calandria, or at one point only, as previously described, it being only essential that the heating medium be admitted in the midst of a group of heating tubes, the downcomer tubes being at a greater distance from the point of application of the heating medium, or at a greater distance from the axis of admission pipe 14, than the heating tubes; the arrangement being such that the heating effect will diminish progressively from the point or axis of application to the outer tubes of the group, that is, the downcomers. The circulation arrangement referred to may be provided for by making the downcomers larger than the heating tubes, or by using baffle means, or by both using the baffles and making the downcomers of larger diameter, as stated. In large installations it may sometimes be desirable to introduce the heating medium at a plurality of points within the calandria, each being surrounded by a group of heating tubes and the latter each surrounded by a series or plurality of downcomers, the circulation in each group being as described above. In that case one or more collecting vessels 10 may be used.

It will be understood that my invention is not limited strictly to the exact details of construction described, but is as broad as is indicated by the accompanying claims.

What I claim is:—

1. In an evaporator, the combination of a calandria having upper and lower heads, a bottom sloping downwardly and inwardly toward the center, below the inner head, a plurality of inner and outer tubes extending between and through said heads, means for introducing a heating medium into the space between said tubes between said heads, centrally thereof, means for causing the heating medium thus introduced to circulate around the inner tubes and thence around the outer tubes, successively, an outwardly slanting dash plate arranged centrally above the upper head to deflect outwardly liquid rising from the inner tubes, and means for introducing liquid to be evaporated into the space into which the tubes open, the arrangement being such as to cause movement of liquid downwardly in all the outermost tubes, upwardly in the inner tubes, and toward the center in the space below the lower head.

2. In an evaporator, the combination of a calandria having upper and lower heads, a bottom sloping downwardly and inwardly toward the center, below the lower head, a plurality of inner and outer tubes extending between and through said heads, means for introducing a heating medium into the space between said tubes between said heads, centrally thereof, means for introducing liquid to be evaporated into the space into which the tubes open, and into said tubes, means for causing a circulation of liquid downwardly in all the outer tubes, toward the center in the space beneath the lower head, and upwardly in the inner tubes, and a collecting vessel for precipitated matter connected to the central portion of said bottom.

3. In an evaporator, the combination of a calandria having upper and lower heads, a bottom sloping downwardly and inwardly toward the center, below the lower head, and a space below the lower head, a plurality of inner tubes and a plurality of outer tubes of larger diameter, all of the same extending between and through said heads in the calandria, means for introducing a heating medium into the space between said tubes between said heads, centrally thereof, and means for causing a circulation of liquid downwardly in all the outer tubes, toward the center in the space beneath the lower head, and upwardly in the inner tubes.

4. In an evaporator, the combination of a calandria having an outer casing, upper and lower heads, a bottom sloping downwardly and inwardly toward the center, below the lower head, a plurality of tubes extending between and through said heads, the outer ones of which are of larger diameter than the inner, dash means above the upper head, arranged to deflect outwardly liquid rising from the inner tubes, means for introducing a heating medium into the space between said tubes, between said heads, centrally thereof, means for causing the circulation of the heating medium around the tubes, from the center toward the outer casing, and means for introducing liquid to be evaporated into the space into which the tubes open.

5. In an evaporator, the combination of a calandria having an outer casing, upper and lower heads and a bottom arranged to provide a space below the lower head, means for introducing a heating medium between said heads at a point at some distance from the outer casing, a plurality of tubes surrounding the space into which the heating medium is directly introduced, a plurality of larger tubes at a greater distance from said last-mentioned space, all of said tubes extending between and through said heads, said bottom having means for the removal of precipitated matter at a point below that at which the heating medium is introduced, and means for causing circulation of liquid downwardly in all said larger tubes, upwardly in the tubes surrounded by said larger tubes, and inwardly from the larger tubes in the space below the lower head, to sweep precipitated matter along said bottom, toward said means for the removal of precipitated matter.

6. In an evaporator, the combination of a calandria having an outer casing, upper and lower heads and a bottom arranged to provide a space below the lower head, means for introducing a heating medium between said heads at a point at some distance from the outer casing, a plurality of tubes surrounding the space into which the heating medium is directly introduced, arranged at different distances from the said space, and extending between and through said heads, said bottom having means for the removal of precipitated matter at a point below that at which the heating medium is introduced, and baffle means arranged between said tubes, and above said upper head, to cause the heating medium to circulate around the same, in such manner that the heating effect will progressively diminish from the point of first application of the heating medium to the tubes most distant therefrom, and circulation of liquid will be caused downwardly in said most distant tubes, upwardly in the tubes surrounded thereby, and toward the point at which precipitated matter may be removed, in the space below the lower head.

This specification signed and witnessed this 25th day of September, 1917.

WILLIAM E. GARRIGUES.

Witnesses:
 DYER SMITH,
 I. McINTOSH.